July 5, 1966  G. G. KLINGER ETAL  3,259,127
LENS CLAMPING ASSEMBLY FOR GAS MASKS
Filed April 13, 1964  2 Sheets-Sheet 2

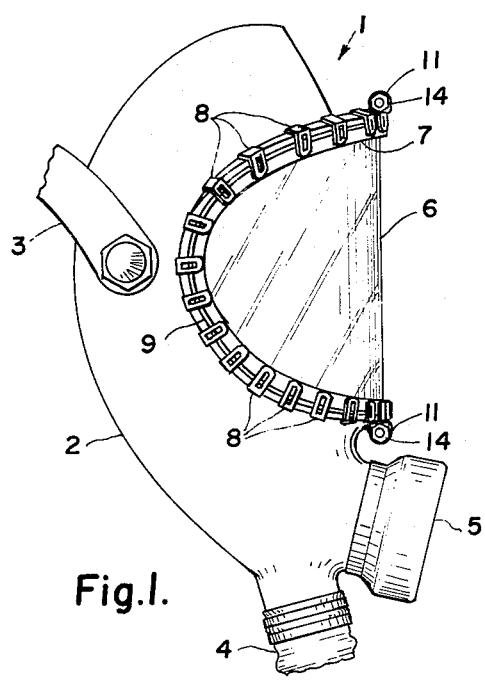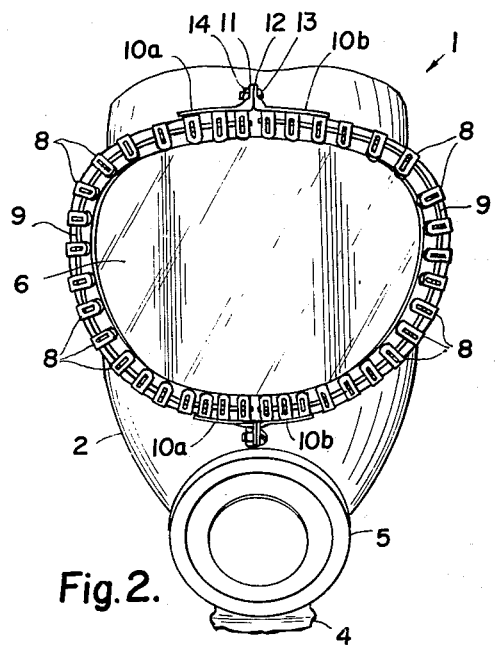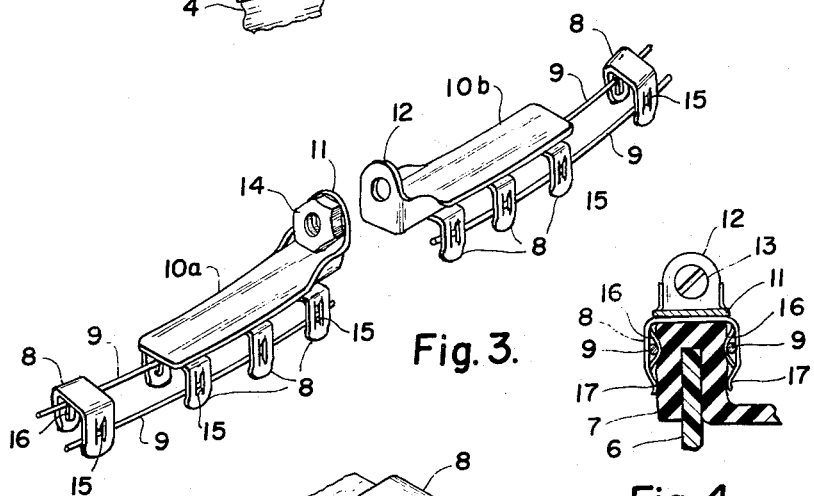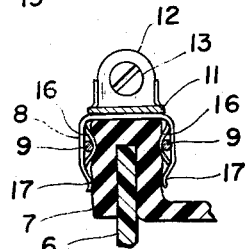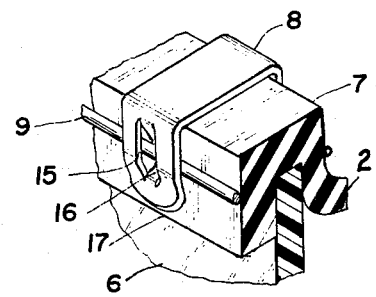

INVENTORS.
GUY G. KLINGER,
GEORGE R. HOFFMASTER
CHARLES J. BOYER and
JACK N. SIMPSON.

BY their ATTORNEY

United States Patent Office 3,259,127
Patented July 5, 1966

3,259,127
LENS CLAMPING ASSEMBLY FOR GAS MASKS
Guy G. Klinger, Shillington, George R. Hoffmaster, Reading, Charles J. Boyer, West Reading, and Jack N. Simpson, Reading, Pa., assignors to The Electric Storage Battery Company, Philadelphia, Pa.
Filed Apr. 13, 1964, Ser. No. 359,321
3 Claims. (Cl. 128—141)

This invention relates to respiratory apparatus, such as gas masks, self contained breathing apparatus, and respirators, and more particularly, to a clamping assembly for mounting a unitary lens in the face piece in an air-tight manner.

In the past, gas masks and the like, having unitary lenses, have poised serious problems in mounting the lens on the face piece in an air-tight manner and in a manner in which the lens could be replaced. Various clamping means have been provided for this purpose, but these, in general, have been quite complicated in construction, expensive to manufacture and not easily or quickly removable or attachable when replacing a broken or pitted lens. This problem has been magnified in view of the compound curvature of the lens.

An object of the present invention is to provide a novel clamping assembly which overcomes the above named disadvantages of previously used assemblies and which involves a minimum number of inexpensive parts which are easily and quickly assembled.

A further object of the invention is to provide a clamping assembly which will insure an air-tight seal when mounted on the lens receiving bead which defines the window opening of a face piece, and which is very easily mountable and dismountable, requiring merely the tightening or loosening of a single screw.

A still further object of the invention is to provide a lens mounting means in a face piece of a gas mask or respirator, which mounting may be easily flexed in various directions to enable it to assume a compound curvature of the lens receiving bead integrally formed on the face piece, defining the window opening.

Other objects and advantages will become more apparent from a study of the following description taken with the accompanying drawings wherein:

FIG. 1 is a side, perspective view of the main portion of a gas mask having a lens-retaining, clamping assembly embodying the principles of the present invention;

FIG. 2 is a front view of the device shown in FIG. 1;

FIG. 3 is a fragmentary, enlarged, perspective view showing the top, free ends of the clamping assembly shown in FIGS. 1 and 2;

FIG. 4 is a cross-sectional view of the structure shown in FIG. 3 when viewed from the right and mounted on the lens-receiving bead or channel portion 7, as shown in FIGS. 1 and 2;

FIG. 5 is a further enlarged, perspective, cross-sectional view taken adjacent one of the clamping elements 8;

Figure 6:
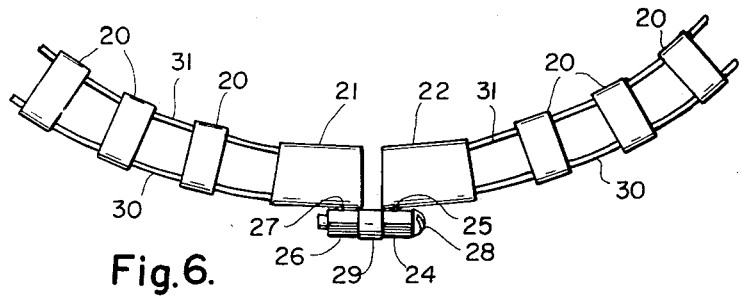
FIG. 6 is a fragmentary, top view.

Referring more particularly to FIGS. 1 and 2 of the drawing, numeral 1 generally denotes a gas mask comprising a face piece 2 of rubber or other flexible material which is held to the head of the wearer by straps 3 connected thereto, shown broken away. The gas mask is provided also with an exhalation valve 5 and a flexible tube 4 of accordion or spiral shape which is attachable to a filtering canister, oxygen or air supply, or merely to an exhalation valve if the structure is a respirator (not shown). The structure hereinbefore described is well known in the art.

The present invention specifically relates to the mounting for a unitary lens 6 of glass or transparent glass or plastic material. Since the perimeter of such lens forms a compound curve, that is, it has a "wraparound" windshield shape, difficulty has been experienced in the past in providing a suitable, readily detachable clamping means for holding the lens in place in a gas-tight manner on the face piece. In accordance with the present invention, and as shown more clearly in FIGS. 3, 4 and 5, the peripheral portion of the lens 6 is projected into and snugly fitted in the grooves of a channel shaped, relatively rigid bead or perimetrical portion 7 of the face piece 2.

Figure 7:
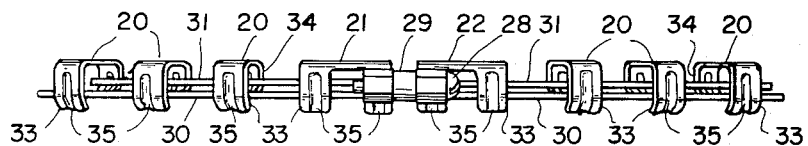
FIG. 7 is a fragmentary, front view, respectively, of a modification of the terminals at the free ends of the clamping assembly.

A pair of wires 9 are bridged and held together by a plurality of evenly spaced, U-shaped clamping elements 8 having inwardly stamped out openings 15 and side strip portions 16 providing loops through which the wires 9 may be extended. The wires 9 and clamping elements 8 may be of stainless steel or other suitable material and extend along the entire periphery of portion 7 and providing a gas-tight fit with lens 6 by tightly compressing the sidewalls of channel portion 7. It is desirable to weld or securely affix the wires 9 to the looped portions 16. In some instances, instead of extending the wires through the loops formed by strip portions 16 the loops may be omitted or made very small and the wires are affixed directly to the inner surfaces of clamping elements 20, as shown in FIGS. 6 and 7. The clamping elements have legs 33 punched in at 35 to form projections which are welded to wires 30, 31. The clamp assembly comprising the wires 30, 31 and clamp elements 20 may be continuous with free ends only at the central top portion provided with terminals 10a and 10b integrally secured to a plurality of clamping elements 8 and which are brought together and held in clamping position by extending a machine screw 13 through registering holes in flanges 11 and 12 and screwing into nut 14 welded or suitably affixed to flange 11. In some instances, however, it may be desirable to provide free ends also at the bottom central portion, as shown in FIG. 2.

Thus, by virtue of the ability of the clamp assembly to flex in various directions so as to assume a compound curve shape, the clamp assembly can be easily detached or attached to the channel shaped element 7 to enable replacement of a broken or scored lens 6.

FIGS. 6, 7, 8 and 9 show a further modification of the clamping assembly, particularly in the terminals for clamping the top free ends, as well as in the means for attaching the clamping elements 20 to the wires 30, 31 and the construction of such elements. The free ends of the clamp assembly are provided with inverted U-shaped terminals 21, 22, each having a depending pair of clamping legs 33 which are embossed or punched inwardly at 35 so as to provide vertical projections on the inner surfaces onto which wires 30, 31 may be more easily welded at 32. This may be done by inserting a welding electrode between legs 33. Nuts 24, 26 are welded or otherwise integrally secured to legs 33 and a spacer washer ring 29, preferably of somewhat compressible plastic material, is positioned therebetween when machine screw 28 is inserted therethrough and through registering nuts 24, 26, of which only nut 26 is threaded. Thus by tightening of screw 28, terminals 21, 22 are brought closer together to tightly wrap the clamp assembly about perimetrical portion 7 of the face piece to provide an air-tight fit with lens 6.

Figure 8:
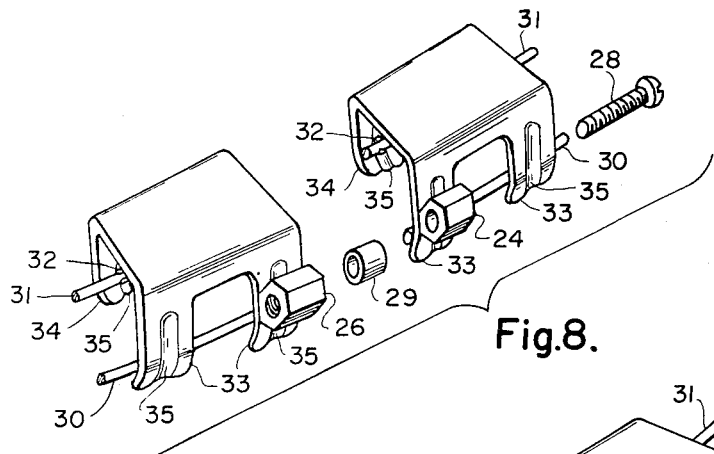
FIG. 8 is an enlarged, fragmentary, exploded view of a further modification of the terminal; and, FIG. 9 is an enlarged, perspective view of one of the clamping elements and more clearly showing the manner in which it is welded to the wires.
Figure 9:
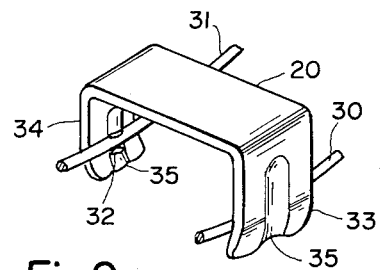

The clamp assembly may form a continuous loop with the exception of the terminal or free ends shown in FIGS. 6 and 7. Alternately, however, free ends and a terminal assembly as shown in FIGS. 6, 7 and 8 may be additionally provided at the lower central portion, in the manner shown in FIG. 2.

Thus it will be seen that we have provided an efficient clamping assembly which may be readily flexed about the compound curvature formed by the grooved perimeter of the lens opening so as to tightly clamp the perimeter of the lens in an air-tight manner and which may be easily and very quickly secured in place merely by tightening of a single screw; moreover, we have provided a clamping assembly for a unitary lens of a gas mask, which assembly comprises a minimum number of simple and inexpensive parts which can be cheaply assembled and which have relatively long life.

While we have illustrated and described several embodiments of our invention, it will be understood that these are by way of illustration only, and that various changes and modifications may be made within the contemplation of our invention and within the scope of the following claims.

We claim:

1. A face mask including a face piece provided with a lens receiving opening of substantially oval shape bounded by a channel shaped bead portion having a groove, a lens having a perimetrical portion snugly fitted in said groove, and a clamping assembly for clamping the sidewalls of said bead portion throughout the perimeter of said bead portion, comprising a pair of wires extending snugly directly against the entire length of the sidewalls of said bead portion so as to compress said sidewalls, a plurality of evenly spaced, inverted U-shaped clamping elements bridging said wires and snugly embracing three adjoining walls of said bead, forming the channel shape, the inner surfaces of opposing sides of said clamping elements having vertically spaced projections between which said wires extend and to which the wires are integrally welded, a terminal secured to each of two free ends of said clamping assembly, each terminal comprising an inverted U-shaped element having a plurality of depending legs extending from each side of the element, and including clamping means extending outwardly of said clamping elements for drawing together said two free ends so as to form an endless loop for tightly grasping said bead.

2. A face mask including a face piece provided with a lens receiving opening of substantially oval shape bounded by a channel shaped bead portion having a groove, a lens having a perimetrical portion snugly fitted in said groove, and a clamping assembly for clamping the sidewalls of said bead portion throughout the perimeter of said bead portion, comprising a pair of wires extending snugly and directly against the entire length of the sidewalls of said bead portion so as to compress said sidewalls, a plurality of evenly spaced, inverted U-shaped clamping elements bridging said wires and snugly embracing three adjoining walls of said bead, forming the channel shape, the inner surfaces of the legs of said clamping elements having vertically and inwardly extending projections intermediate the sides and intermediate the top and bottom of said legs directly engaging said sidewalls, said wires extending through and anchored to said projections, and clamping means at the terminals of said clamping assembly for drawing together the free ends of said clamping assembly so as to form an endless loop for tightly grasping said bead.

3. A face mask as recited in claim 2, wherein said clamping means includes a sleeve welded to the outer leg of one of said terminals, a registering nut welded to the outer leg of the other of said terminals, and a machine screw extending through said sleeve and nut for drawing said terminals together.

References Cited by the Examiner
UNITED STATES PATENTS
2,996,722  8/1961  Jacobs _____ 128—141 X RICHARD A. GAUDET, *Primary Examiner.*

W. E. KAMM, *Assistant Examiner.*